United States Patent
Yuasa

(10) Patent No.: US 10,670,731 B2
(45) Date of Patent: Jun. 2, 2020

(54) POSITION AND AZIMUTH MEASUREMENT DEVICE AND SURVEYING DEVICE

(71) Applicant: TOPCON CORPORATION, Itabashi-ku, Tokyo (JP)

(72) Inventor: Junichi Yuasa, Itabashi-ku (JP)

(73) Assignee: TOPCON CORPORATION, Itabashi-ku, Tokyo (JP)

( * ) Notice: Subject to any disclaimer, the term of this patent is extended or adjusted under 35 U.S.C. 154(b) by 239 days.

(21) Appl. No.: 15/664,368

(22) Filed: Jul. 31, 2017

(65) Prior Publication Data
US 2018/0038963 A1 Feb. 8, 2018

(30) Foreign Application Priority Data
Aug. 3, 2016 (JP) .................. 2016-153008

(51) Int. Cl.
*G01S 19/28* (2010.01)
*G01S 17/42* (2006.01)
(Continued)

(52) U.S. Cl.
CPC .............. *G01S 19/28* (2013.01); *G01C 9/00* (2013.01); *G01C 15/002* (2013.01); *G01S 17/08* (2013.01);
(Continued)

(58) Field of Classification Search
CPC .......... G01S 19/28; G01S 17/08; G01S 19/36; G01S 19/39; G01S 19/42; G01S 17/42; G01S 19/14; G01C 9/00; G01C 15/002
(Continued)

(56) References Cited

U.S. PATENT DOCUMENTS 5,077,557 A * 12/1991 Ingensand .............. G01C 15/00
342/352
5,233,357 A * 8/1993 Ingensand .............. G01C 15/00
342/352
(Continued)

FOREIGN PATENT DOCUMENTS

EP 2875317 B1 * 8/2017
JP 2014074596 A * 4/2014
(Continued)

*Primary Examiner* — Bernarr E Gregory
*Assistant Examiner* — Nuzhat Pervin
(74) *Attorney, Agent, or Firm* — Chiesa Shahinian & Giantomasi PC

(57) ABSTRACT

A position and azimuth measurement device capable of measuring geographical coordinates and azimuth angles and a surveying device are provided. The position and azimuth measurement device includes a GNSS device, having a GNSS antenna for obtaining position information thereof; a horizontal rotating section capable of rotating the GNSS antenna horizontally; a leveling section capable of leveling the horizontal rotating section; a horizontal angle detector configured to detect a horizontal angle of the horizontal rotating section; and a control device. The control device causes the GNSS device to continuously obtain the position information while causing the horizontal rotating section leveled by the leveling section to make one full rotation, and computes geographical coordinates and an azimuth angle on the basis of the position information obtained throughout the full rotation.

12 Claims, 6 Drawing Sheets

(51) Int. Cl.
*G01C 15/00* (2006.01)
*G01S 19/42* (2010.01)
*G01S 19/36* (2010.01)
*G01S 19/39* (2010.01)
*G01S 19/14* (2010.01)
*G01C 9/00* (2006.01)
*G01S 17/08* (2006.01)

(52) U.S. Cl.
CPC .............. *G01S 17/42* (2013.01); *G01S 19/14*
(2013.01); *G01S 19/36* (2013.01); *G01S 19/39*
(2013.01); *G01S 19/42* (2013.01)

(58) Field of Classification Search
USPC .................................................... 342/357.67
See application file for complete search history.

(56) References Cited

U.S. PATENT DOCUMENTS

| | | | | |
|---|---|---|---|---|
| 5,821,900 A | * | 10/1998 | Kishimoto | G01C 1/02 701/300 |
| 8,401,238 B2 | * | 3/2013 | Stahlin | G01C 21/30 382/106 |
| 9,522,809 B2 | * | 12/2016 | Conquest | B66C 13/46 |
| 2014/0022539 A1 | * | 1/2014 | France | G01S 19/48 356/139.1 |
| 2014/0278076 A1 | * | 9/2014 | Conquest | B66C 13/46 701/468 |
| 2014/0278078 A1 | * | 9/2014 | Cameron | B66C 13/46 701/480 |
| 2015/0045058 A1 | * | 2/2015 | Rudow | H04M 1/72572 455/456.1 |
| 2015/0045059 A1 | * | 2/2015 | Rudow | H04W 4/021 455/456.1 |
| 2016/0035096 A1 | * | 2/2016 | Rudow | G06F 16/51 348/135 |

FOREIGN PATENT DOCUMENTS

| | | | | |
|---|---|---|---|---|
| JP | 2014074597 A | * | 4/2014 | |
| WO | WO-2014018461 A2 | * | 1/2014 | ............ G01C 15/00 |
| WO | WO-2015120411 A1 | * | 8/2015 | ............ B66C 13/46 |
| WO | WO-2016017261 A1 | * | 2/2016 | ............ G01S 19/22 |

* cited by examiner

POSITION AND AZIMUTH MEASUREMENT DEVICE AND SURVEYING DEVICE

CROSS-REFERENCE TO RELATED APPLICATIONS

This application claims the benefit of Japanese Patent Application No. 2016-153008, filed Aug. 3, 2016, which is incorporated herein by reference in its entirety.

BACKGROUND

1. Technical Field

The present invention relates to a position and azimuth measurement device capable of measuring geographical coordinates, and to a surveying device including such a position and azimuth measurement device.

2. Background Art

When installing a surveying device for surveying, it is necessary to measure the geographical coordinates of a center position of the surveying device at the position of installation, and to set an azimuth angle (collimation direction) of the surveying device.

Accordingly, the surveying device is provided with a position and azimuth measurement device that measures geographical coordinates (position information) by receiving observation values from satellites, such as a Global Navigation Satellite System (GNSS) device. A GNSS device obtains position information from observation values (position coordinates) received from a plurality of satellites and, on the basis of the position information, calculates geographical coordinates and an azimuth angle.

However, observation values received from satellites include error, and thus geographical coordinates and azimuth angles computed from the received observation values will also include error.

Some surveying devices are provided with two GNSS devices in order to reduce the influence of error in received observation values. The GNSS devices are installed such that there is a predetermined distance between the reception antennae thereof, for example from several tens of cm to several m, and the geographical coordinates and azimuth angle are calculated on the basis of observation values received by the respective reception antennae.

Doing so reduces the influence of error in the received observation values.

However, this configuration requires two GNSS devices in order to reduce error in the observation values, which is problematic in that it increases the manufacturing cost of the surveying device.

SUMMARY

The invention provides a position and azimuth measurement device capable of measuring geographical coordinates and azimuth angles cheaply and accurately, as well as a surveying device.

An aspect of the invention relates to a position and azimuth measurement device including: a GNSS device, including a GNSS antenna, configured to obtain position information of the GNSS antenna on the basis of observation values from satellites; a horizontal rotating section capable of rotating the GNSS antenna horizontally; a leveling section capable of leveling the horizontal rotating section; a horizontal angle detector configured to detect a horizontal angle of the horizontal rotating section; and a control device. The GNSS antenna is provided at a known distance from a vertical axial center of the horizontal rotating section; and the control device causes the GNSS device to continuously obtain the position information while causing the horizontal rotating section leveled by the leveling section to make one full rotation, and is configured to compute geographical coordinates and an azimuth angle on the basis of the position information obtained throughout the full rotation.

Another aspect of the invention relates to a position and azimuth measurement device in which, of the satellites from which the GNSS device obtains the observation values, the control device selects only satellites capable of outputting observation values throughout the full rotation.

Another aspect of the invention relates to a position and azimuth measurement device in which the control device is configured to create a shape filter having a ring shape and a predetermined width with respect to a circle having a radius equivalent to a distance between the vertical axial center and the GNSS antenna, and match the shape filter to a position in which the number of pieces of the position information located within the shape filter is highest.

Another aspect of the invention relates to a position and azimuth measurement device in which the control device is configured to fit a circle relative to the position information within the shape filter and compute center coordinates of the circle that is fitted.

Another aspect of the invention relates to a position and azimuth measurement device in which the control device includes a communication section configured to obtain measurement information of a known observation point, and is configured to compute the geographical coordinates on the basis of the measurement information obtained through the communication section.

Another aspect of the invention relates to a position and azimuth measurement device in which the control device is configured to set a coordinate obtainment position at a desired position of the GNSS antenna and at least one coordinate obtainment position at a position of the GNSS antenna rotated from the coordinate obtainment position by a predetermined angle, stop rotation of the horizontal rotating section for a predetermined amount of time at each of the coordinate obtainment positions, and compute the azimuth angle on the basis of position information obtained at each of the coordinate obtainment positions while the rotation of the horizontal rotating section is stopped.

Another aspect of the invention relates to a position and azimuth measurement device in which a numerical filter configured to allow values near a center to pass is applied to the position information obtained at each of the coordinate obtainment positions.

Another aspect of the invention relates to a position and azimuth measurement device in which each of representative values is selected from each piece of position information obtained at each of the coordinate obtainment positions, and the azimuth angle is computed on the basis of a coordinate difference among the representative values.

Another aspect of the invention relates to a surveying device including: a GNSS device, including a GNSS antenna, configured to obtain position information of the GNSS antenna on the basis of observation values from satellites; a horizontal rotating section capable of rotating the GNSS antenna horizontally; a leveling section capable of leveling the horizontal rotating section; a telescope section provided on the horizontal rotating section and capable of vertical rotation; a rangefinding section, housed within the telescope section, configured to measure a range by emitting rangefinding light and receiving the rangefinding light that has been reflected; a horizontal angle detector configured to detect a horizontal angle of the horizontal rotating section; a vertical angle detector configured to detect a vertical angle of the telescope section; and a control device. The GNSS antenna is provided at a known distance from a vertical axial center of the horizontal rotating section; and the control device causes the GNSS device to continuously obtain the position information while causing the horizontal rotating section leveled by the leveling section to make one full rotation, and is configured to compute geographical coordinates and an azimuth angle on the basis of the position information obtained throughout the full rotation.

Another aspect of the invention relates to a surveying device in which, of the satellites from which the GNSS device obtains the observation values, the control device selects only satellites capable of outputting observation values throughout the full rotation.

Another aspect of the invention relates to a surveying device in which the control device is configured to create a shape filter having a ring shape and a predetermined width with respect to a circle having a radius equivalent to a distance between the vertical axial center and the GNSS antenna, and match the shape filter to a position in which the number of pieces of the position information located within the shape filter is highest.

Another aspect of the invention relates to a surveying device in which the control device is configured to fit a circle relative to the position information within the shape filter and compute center coordinates of the circle that is fitted.

Another aspect of the invention relates to a surveying device in which the control device includes a communication section configured to obtain measurement information of a known observation point, and is configured to compute the geographical coordinates on the basis of the measurement information obtained through the communication section.

Another aspect of the invention relates to a surveying device in which the control device is configured to set a coordinate obtainment position at a desired position of the GNSS antenna and at least one coordinate obtainment position at a position of the GNSS antenna rotated from the coordinate obtainment position by a predetermined angle, stop rotation of the horizontal rotating section for a predetermined amount of time at each of the coordinate obtainment positions, and compute the azimuth angle on the basis of position information obtained at each of the coordinate obtainment positions while the rotation of the horizontal rotating section is stopped.

Another aspect of the invention relates to a surveying device in which a numerical filter configured to allow values near a center to pass is applied to the position information obtained at each of the coordinate obtainment positions.

Another aspect of the invention relates to a surveying device in which each of representative values is selected from each piece of position information obtained at each of the coordinate obtainment positions, and the azimuth angle is computed on the basis of a coordinate difference among the representative values.

According to an aspect of the invention, a position and azimuth measurement device includes: a GNSS device, including a GNSS antenna, configured to obtain position information of the GNSS antenna on the basis of observation values from satellites; a horizontal rotating section capable of rotating the GNSS antenna horizontally; a leveling section capable of leveling the horizontal rotating section; a horizontal angle detector configured to detect a horizontal angle of the horizontal rotating section; and a control device. The GNSS antenna is provided at a known distance from a vertical axial center of the horizontal rotating section; and the control device causes the GNSS device to continuously obtain the position information while causing the horizontal rotating section leveled by the leveling section to make one full rotation, and is configured to compute geographical coordinates and an azimuth angle on the basis of the position information obtained throughout the full rotation. Accordingly, manufacturing costs can be reduced, and geographical coordinates and an azimuth angle can be measured accurately.

According to an aspect of the invention, a surveying device includes: a GNSS device, including a GNSS antenna, configured to obtain position information of the GNSS antenna on the basis of observation values from satellites; a horizontal rotating section capable of rotating the GNSS antenna horizontally; a leveling section capable of leveling the horizontal rotating section; a telescope section provided on the horizontal rotating section and capable of vertical rotation; a rangefinding section, housed within the telescope section, configured to measure a range by emitting rangefinding light and receiving the rangefinding light that has been reflected; a horizontal angle detector configured to detect a horizontal angle of the horizontal rotating section; a vertical angle detector configured to detect a vertical angle of the telescope section; and a control device. The GNSS antenna is provided at a known distance from a vertical axial center of the horizontal rotating section; and the control device causes the GNSS device to continuously obtain the position information while causing the horizontal rotating section leveled by the leveling section to make one full rotation, and is configured to compute geographical coordinates and an azimuth angle on the basis of the position information obtained throughout the full rotation. Accordingly, the excellent effects of reducing manufacturing costs and accurately measuring geographical coordinates and an azimuth angle can be achieved.

DESCRIPTION OF EMBODIMENTS

Embodiments of the invention will be described next with reference to the drawings.

Figure 1:
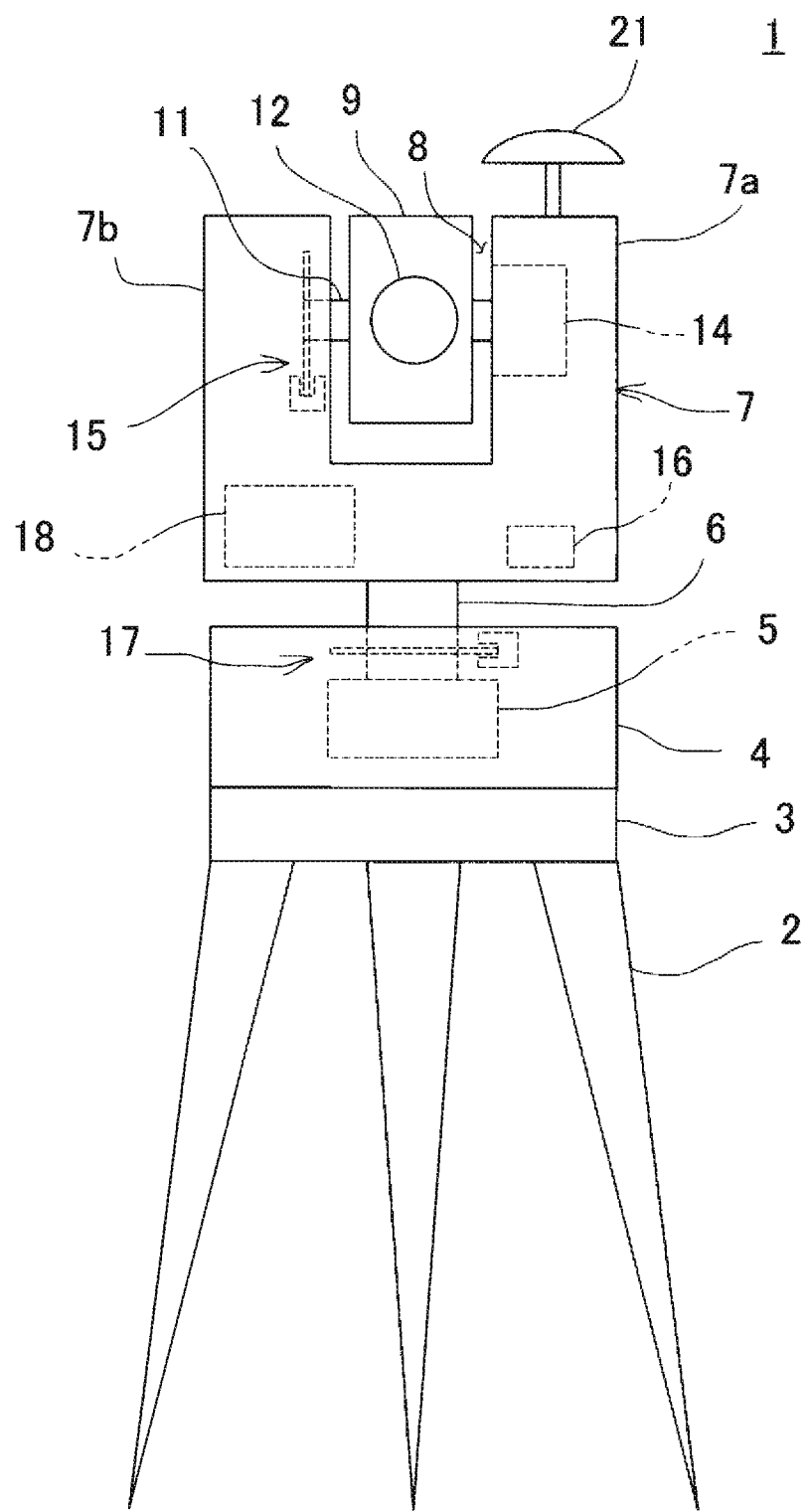
FIG. 1 is a front view of a surveying device according to embodiments of the invention.

First, an overview of a surveying device 1 embodying the invention will be described with reference to FIG. 1.

The surveying device 1 is a total station, for example, including a tripod 2 installed in a predetermined position. A leveling section 3 is provided on the tripod 2, and a base section 4 is provided on the leveling section 3. A horizontal rotational driving section 5 including a horizontal motor is housed within the base section 4. The horizontal rotational driving section 5 includes a horizontal rotation shaft 6 having a vertical axial center, and a mount section 7, serving as a horizontal rotating section, is attached to an upper end of the horizontal rotation shaft 6.

The mount section 7 has a recess portion 8, and a telescope section 9, serving as a vertical rotating section, is housed within the recess portion 8. The telescope section 9 is rotatably supported by the mount section 7 via a vertical rotation shaft 11 having a horizontal axial center. A collimator 12 having a rangefinding light axis is provided in the telescope section 9, and a rangefinding section 13 (see FIG. 2) and the like are housed within the telescope section 9.

In the following, the side of the mount section 7 to the right of the recess portion 8 in FIG. 1 will be described as a mount section 7a, and the side of the mount section 7 to the left of the recess portion 8 in FIG. 1 will be described as a mount section 7b.

A vertical rotation driving section 14 having a vertical motor is housed within the mount section 7, and the vertical rotation driving section 14 is linked to the vertical rotation shaft 11. The telescope section 9 is fully rotated in the vertical direction by the vertical rotation driving section 14. A vertical angle detector 15 is provided in the vertical rotation shaft 11, and a vertical angle of the telescope section 9 is detected by the vertical angle detector 15.

Furthermore, an inclination detector 16 such as a tilt sensor is provided in the mount section 7, and the inclination, or a horizontal state, of the mount section 7 is detected by the inclination detector 16.

The horizontal rotational driving section 5 is linked to the horizontal rotation shaft 6, and the mount section 7 is fully rotated in the horizontal direction by the horizontal rotational driving section 5. A horizontal angle detector 17 is provided in the horizontal rotation shaft 6, and a horizontal angle of the mount section 7 is detected by the horizontal angle detector 17. A direction angle detector is constituted by the vertical angle detector 15 and the horizontal angle detector 17.

The horizontal rotational driving section 5 and the vertical rotation driving section 14 constitute a rotational driving section, and the telescope section 9 is rotated in a desired state in two directions, namely vertical and horizontal, by the rotational driving section. Meanwhile, the vertical angle and the horizontal angle are detected in real time by the vertical angle detector 15 and the horizontal angle detector 17.

A control device 18 is installed within the mount section 7, and a Global Navigation Satellite System (GNSS) device 19 (see FIG. 2), serving as a position and azimuth measurement device, is provided in a prescribed position of the mount section 7. A center position of the GNSS device 19 and a center position of the surveying device 1 (a measurement reference position) are known.

The GNSS device 19 includes a GNSS receiver 20 (see FIG. 2) and a GNSS antenna 21, and the GNSS antenna 21 is provided on an upper surface of the mount section 7a. A distance between an axial center of the horizontal rotation shaft 6 (the vertical axial center) and the center position of the GNSS antenna 21 is known.

The GNSS device 19 receives observation values, transmitted from a plurality of satellites, from the GNSS antenna 21. The GNSS device 19 also issues GNSS position information on the basis of the observation values, and a GNSS time signal on the basis of time signals contained in the observation values.

Figure 2:
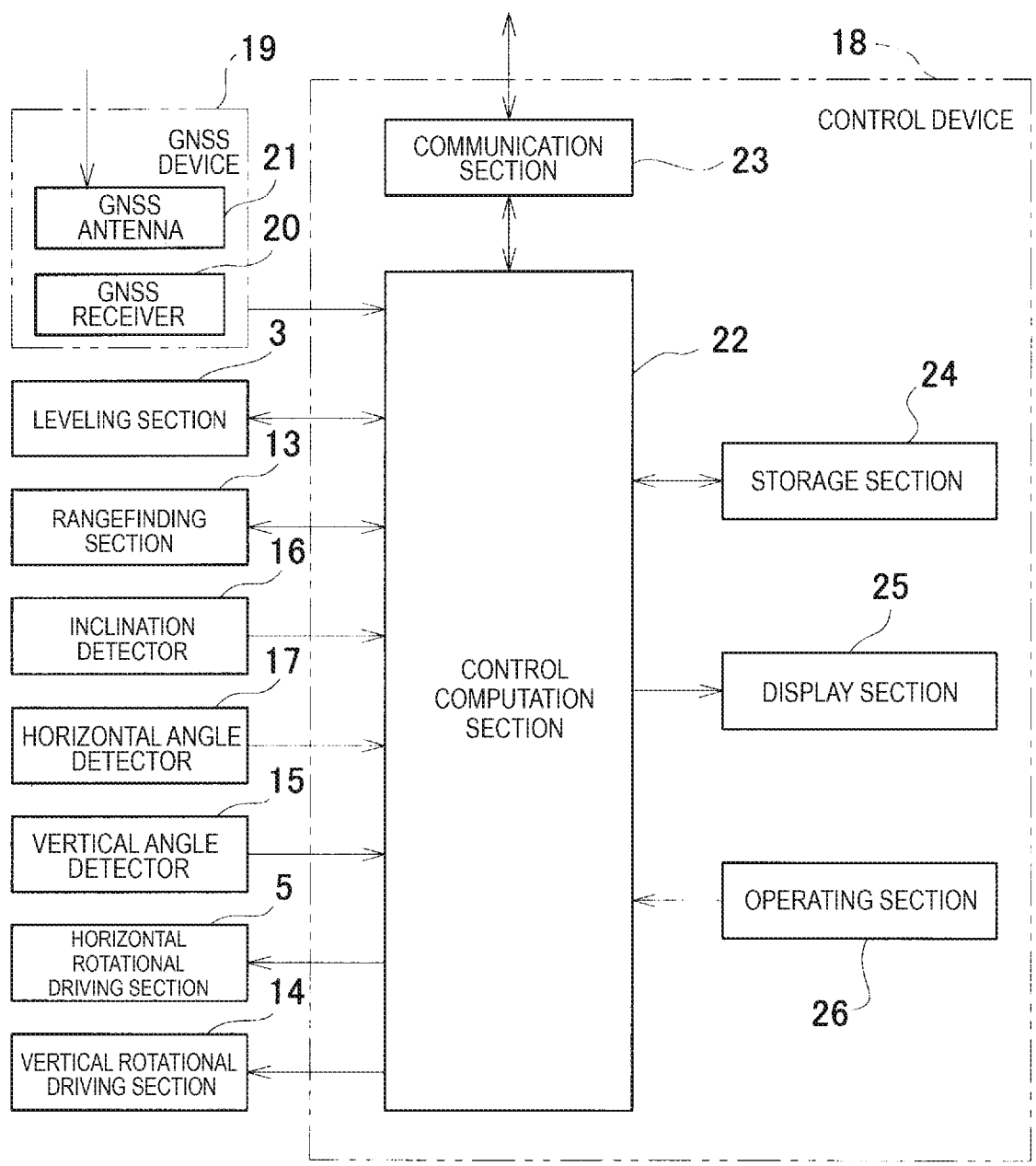
FIG. 2 is a block diagram illustrating an overview of the surveying device according to embodiments of the invention.

Next, an overview of the configuration of the surveying device 1 will be described with reference to FIG. 2.

The control device 18 is constituted of a control computation section 22, a communication section 23, a storage section 24, a display section 25, an operating section 26, and the like.

The control computation section 22 controls the leveling section 3 to level the mount section 7 to a horizontal state on the basis of the inclination of the mount section 7 detected by the inclination detector 16. The control computation section 22 also causes the vertical rotation driving section 14 to rotate the telescope section 9 in the vertical direction. The control computation section 22 also causes the horizontal rotational driving section 5 to rotate the mount section 7 horizontally. The telescope section 9 is oriented in a desired direction through the combined vertical and horizontal rotation.

The control computation section 22 also controls the rangefinding section 13. For example, the rangefinding section 13 emits pulse-form rangefinding light, receives the rangefinding light reflected by a measurement target object, and measures the distance to the measurement target object on the basis of the received reflected rangefinding light.

Furthermore, the control computation section 22 stores a rangefinding value, a horizontal angle from the horizontal angle detector 17 at the time of the rangefinding, and a vertical angle from the vertical angle detector 15 at the time of the rangefinding in association with each other in the storage section 24.

The communication section 23 can be connected to the Internet over a wire or wirelessly. A known measurement point, for example, the position information (measurement information) of a known observation point publicized by the government, can be obtained over the Internet through the communication section 23. The Internet position information (measurement information) of the observation point includes information such as an amount of error arising when the known coordinates have been measured by the GNSS device 19. Note that the communication section 23 may be provided in the GNSS device 19.

The storage section 24 stores various programs for operating the surveying device 1. The stored programs include, for example, the following: a sequence program for executing rangefinding and angle measurement; a control program for controlling the driving of the leveling section 3, the horizontal rotational driving section 5, and the vertical rotation driving section 14; a position information storage program for storing the GNSS position information from the GNSS device 19 in association with the horizontal angle from the horizontal angle detector 17; a filter creation program that creates a filter for excluding information having a high degree of error from the stored GNSS position information; a matching program that matches the filter to the GNSS position information; a geographical coordinate computation program that computes the geographical coordinates of the surveying device 1 on the basis of the remaining GNSS position information; a correction program that corrects the computed geographical coordinates on the basis of the known Internet position information (measurement information) obtained from the communication section 23; an azimuth angle computation program that computes an azimuth angle of the surveying device 1 on the basis of the corrected position information; and a display program for displaying various types of information in the display section 25.

The storage section 24 also has a data storage region. Measurement data, GNSS position information data obtained by the GNSS device 19, Internet position information data from the communication section 23, setting values for setting the number of pieces of GNSS position information included in a shape filter 31 (described later), and the like are stored in the data storage region.

The operating section 26 is capable of inputting measurement conditions for the surveying device 1, various types of instructions such as to start and stop measurement, and the like. Furthermore, the display section 25 displays current measurement conditions, measurement results, and the like.

Of the constituent elements of the surveying device 1, the mount section 7, the GNSS device 19, the horizontal rotational driving section 5, the horizontal angle detector 17, the inclination detector 16, the control device 18, and the like constitute the position and azimuth measurement device that measures the geographical coordinates and the azimuth angle at the position of installation of the surveying device 1.

Figure 3:
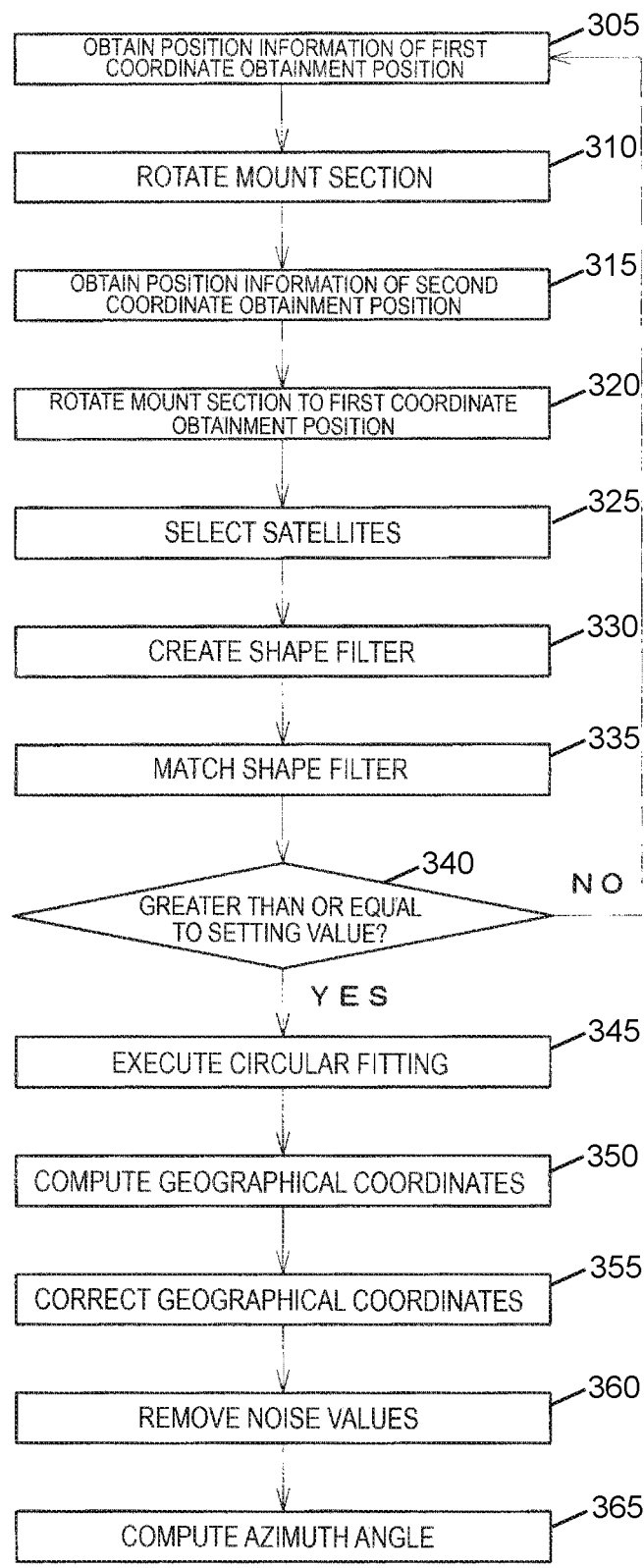
FIG. 3 is a flowchart illustrating the computation of geographical coordinates and an azimuth angle according to embodiments of the invention.

Next, the measurement of the geographical coordinates and the measurement of the azimuth angle (collimation direction) by the position and azimuth measurement device will be described using the flowchart 300 in FIG. 3 and FIG. 4.

First, at step 305, the horizontal angle is obtained by the horizontal angle detector 17 with the telescope section 9 pointed in any desired direction, and the geographical coordinates of the GNSS antenna 21 at the obtained horizontal angle are set as a first coordinate obtainment position 27, serving as an initial position. The mount section 7 is stopped at the first coordinate obtainment position 27 for a predetermined amount of time. During the stop time, the GNSS device 19 receives observation values from the satellites through the GNSS antenna 21 and continually obtains the GNSS position information (geographical coordinates). All of the GNSS position information obtained in the stopped state are associated with the horizontal angle and stored in the storage section 24 as obtained position information.

Upon a predetermined amount of time passing while in the first coordinate obtainment position 27, at step 310, the control computation section 22 drives the horizontal rotational driving section 5 to rotate the mount section 7 horizontally at a predetermined velocity.

While the mount section 7 is rotating, the GNSS position information from the GNSS device 19 is obtained continually in real time, and is stored in the storage section 24 in association with the horizontal angle from the time of obtainment.

The rotation of the mount section 7 is stopped for a predetermined amount of time upon the GNSS antenna 21 reaching a position rotated from the first coordinate obtainment position 27 by a predetermined horizontal rotation angle, or in other words, a second coordinate obtainment position 28 at step 315. This is, for example, a position at which the mount section 7 is rotated 180° from the first coordinate obtainment position 27. The GNSS position information at the second coordinate obtainment position 28 continues to be obtained by the GNSS device 19 even while the rotation of the mount section 7 is stopped.

After the rotation of the mount section 7 has been stopped for a predetermined amount of time, the control computation section 22 again drives the horizontal rotational driving section 5, at step 320, to rotate the mount section 7 horizontally until the GNSS antenna 21 reaches the first coordinate obtainment position 27. The GNSS position information from the GNSS device 19 is obtained continually in real time even during the movement from the second coordinate obtainment position 28 to the first coordinate obtainment position 27, and the GNSS position information is stored in the storage section 24 in association with the horizontal angle from the time of obtainment.

By reaching the first coordinate obtainment position 27, the GNSS antenna 21 makes a single rotation (360°) about the vertical axial center of the surveying device 1. 360° worth of the GNSS position information is obtained by the GNSS device 19 along the path of a circle taking the distance from the vertical axial center to the GNSS antenna 21 as a radius R.

The GNSS device 19 is capable of receiving observation values from a plurality of satellites. However, the satellites from which the observation values can be obtained differ depending on the position of the GNSS antenna 21. Here, the control computation section 22 selects, at step 325, only the satellites that have outputted observation values throughout the entire 360° without interruption. This is because the GNSS position information obtained on the basis of the observation values from satellites that have not outputted the observation values for the entire rotation become a cause of error when computing the geographical coordinates of the surveying device 1.

Figure 4:
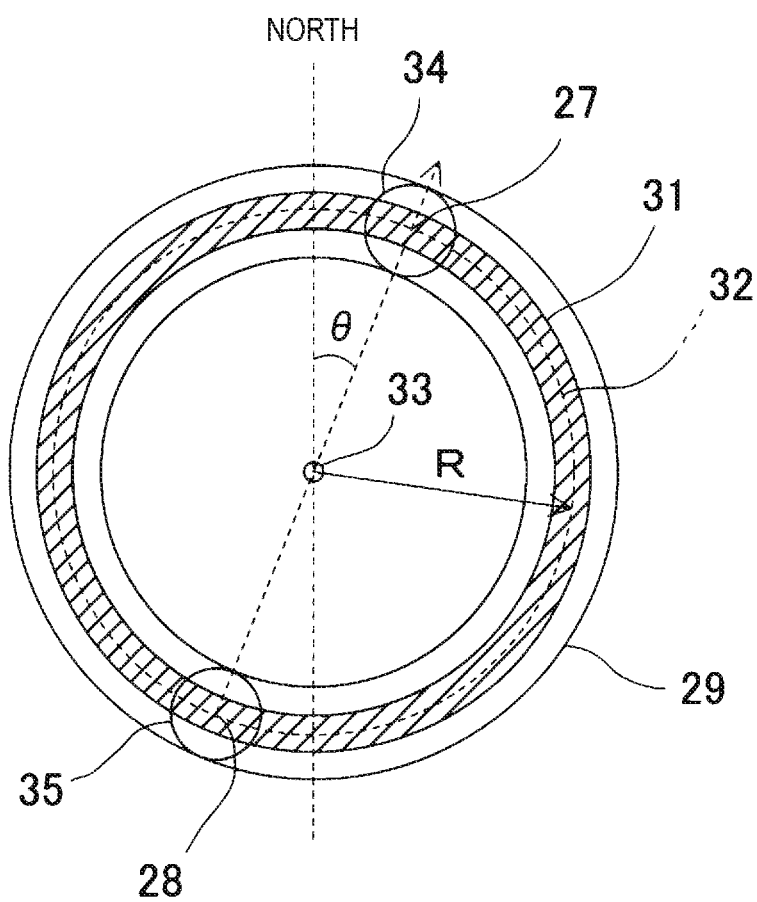
FIG. 4 is a descriptive diagram illustrating the computation of geographical coordinates and an azimuth angle according to embodiments of the invention.

Note that the obtained GNSS position information is, as illustrated in FIG. 4, obtained throughout a position information distribution area 29 formed along a circle 32. The width of the position information distribution area 29 changes in accordance with the precision of the GNSS device 19, and corresponds to measurement error of the GNSS device 19. The width of the position information distribution area 29 is approximately from ±1 to 2 cm from the circle 32 defined by the radius R. Note that the width of the position information distribution area 29 is determined by the measurement error of the GNSS device 19, and is thus not affected by the size of the radius of the circle 32.

Next, at step 330, the control computation section 22 creates the shape filter 31. The shape filter 31 is a filter for selecting the GNSS position information, and is a ring-shaped filter having a width of, for example, ±1 cm from the circle defined by the radius R. Note that the width of the shape filter 31 is set in accordance with the measurement accuracy of the GNSS device 19.

Upon the shape filter 31 being created, at step 335, the control computation section 22 matches the shape filter 31 to a position, in the position information distribution area 29, where there is the greatest number of pieces of the GNSS position information present in the shape filter 31.

At this time, at step 340, the control computation section 22 compares the number of pieces of GNSS position information present in the shape filter 31 with a pre-set setting value. In the case where the number of pieces of GNSS position information is less than the setting value, the control computation section 22 repeats the processing from step 305 to step 335.

In the case where the number of pieces of GNSS position information has been determined to be greater than or equal to the setting value, at step 345, the control computation section 22 carries out circular fitting, using the least squares method, on the GNSS position information group present in the shape filter 31, and calculates the circle 32 approximating the GNSS position information group. Alternatively, the control computation section 22 computes an approximated circle having the lowest remainder with respect to the GNSS position information group.

After the circular fitting process, at step 350, the control computation section 22 computes center coordinates of the circle 32, or in other words, geographical coordinates 33 of the surveying device 1, on the basis of an equation expressing the fitted circle 32.

Upon the geographical coordinates 33 being computed, at step 355, the control computation section 22 obtains the position information of the known measurement point from the communication section 23, for example the Internet position information (measurement information) of the observation point publicized by the government. The control computation section 22 then corrects the geographical coordinates 33 on the basis of the Internet position information to finish the process of measuring the geographical coordinates 33.

In FIG. 4, 34 indicates a position information distribution range of the GNSS position information obtained at the first coordinate obtainment position 27. The size of the distribution range is related to the magnitude of error in the GNSS position information. Meanwhile, 35 indicates a position information distribution range at the second coordinate obtainment position 28. The control computation section 22 applies a numerical filter (a median filter or a Laplacian filter, for example), that allows values near a center to pass, to the GNSS position information groups within the position information distribution range 34 and the position information distribution range 35, and removes noise values of high error at step 360.

At step 365, the control computation section 22 selects a median value of the GNSS position information group within the position information distribution range 34 from which noise values have been removed, or an average value of a central area of the GNSS position information group in the position information distribution range 34, as a first representative value. The control computation section 22 also selects a median value of the GNSS position information group within the position information distribution range 35, or an average value of a central area of the GNSS position information group in the position information distribution range 35, as a second representative value.

Finally, on the basis of a coordinate difference between the first representative value and the second representative value, the control computation section 22 computes an azimuth angle θ (collimation direction) of the surveying device 1 based on due north. This ends the process of measuring the azimuth angle of the surveying device 1.

Figure 5A:
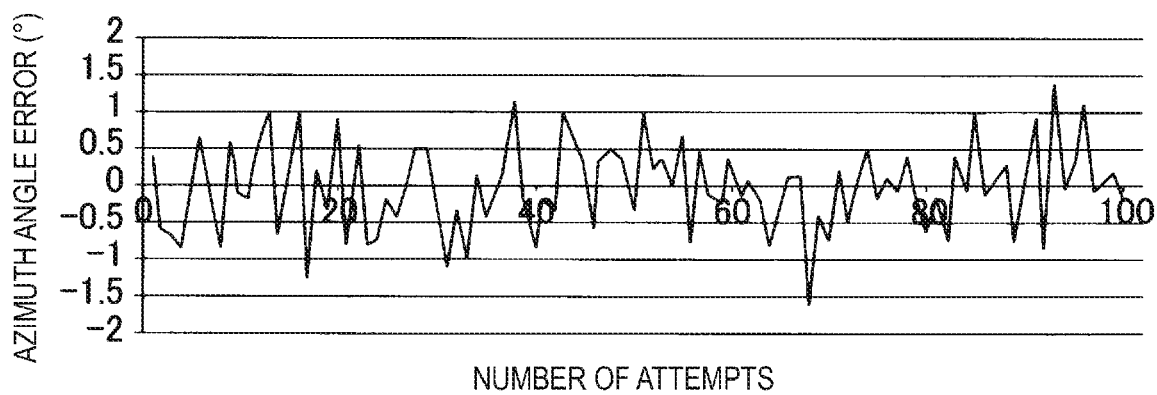
FIG. 5A is a graph illustrating error in an azimuth angle computed using a method according to related art.
Figure 5B:
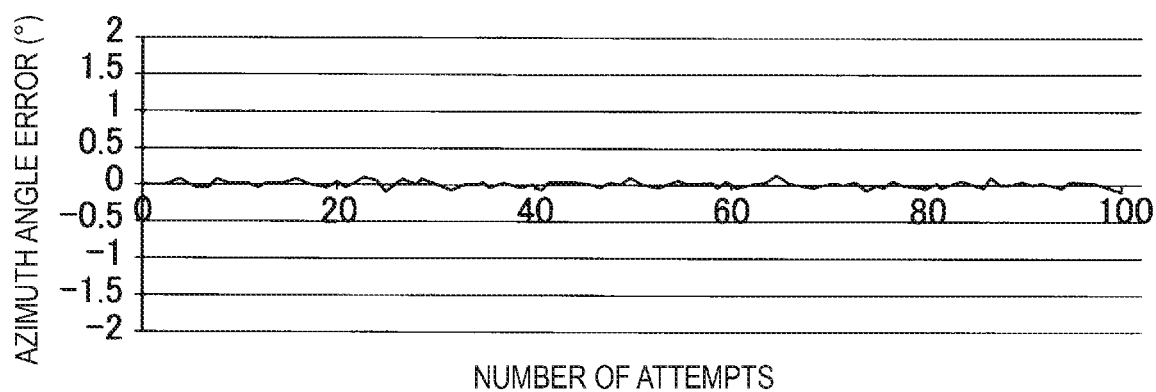
FIG. 5B is a graph illustrating error in an azimuth angle computed using the method according to embodiments of the invention.

FIG. 5A shows graphs 500 which indicates error in the case where the azimuth angle of the surveying device 1 is calculated 100 times on the basis of a single piece of GNSS position information at the first coordinate obtainment position 27 and a single piece of GNSS position information at the second coordinate obtainment position 28, whereas FIG. 5B shows graph 505 which indicates error in the case where the azimuth angle of the surveying device 1 is calculated 100 times through the method according to the present embodiment. In FIGS. 5A and 5B, the horizontal axis represents the number of measurement attempts, whereas the vertical axis represents the error in each measurement.

In the case illustrated in FIG. 5A, the error in the GNSS position information obtained by the GNSS device 19 is directly reflected in the results of computing the azimuth angle of the surveying device 1, and thus error of a maximum of approximately ±1.5° arises in the azimuth angle.

However, in the case illustrated in FIG. 5B, only error of a maximum of approximately ±0.1° arises in the azimuth angle of the surveying device 1, and thus it can be seen that the measurement accuracy of the azimuth angle is greatly improved.

Upon the geographical coordinates and azimuth angle being measured by the position and azimuth measurement device, the measurement results are set in the surveying device 1 as reference values. By collimating a measurement point using the collimator 12 and measuring the range of the measurement point using the rangefinding section 13, accurate absolute coordinates of the measurement point can be measured on the basis of the vertical angle and horizontal angle detected by the vertical angle detector 15 and the horizontal angle detector 17, respectively, the rangefinding result measured by the rangefinding section 13, and the reference value.

As described thus far, according to the present example, the GNSS antenna 21 is provided in a position distanced from the vertical axial center of the surveying device 1 by a predetermined distance, the GNSS position information is obtained by the GNSS device 19 while having the mount section 7 make a single rotation, and the geographical coordinates and azimuth angle of the surveying device 1 are computed on the basis of the GNSS position information for the entire rotation.

Accordingly, the computation is carried out on the basis of many pieces of GNSS position information, and thus the measurement accuracy of the geographical coordinates and the azimuth angle can be improved. Additionally, only a single GNSS device 19 and a single GNSS antenna 21 need to be provided in the surveying device 1, thus the manufacturing cost of the surveying device 1 can be reduced.

Furthermore, according to the present embodiment, of the satellites from which the observation values can be received, the GNSS device 19 selects only the satellites capable of outputting observation values throughout the entire rotation of the mount section 7, and uses those values to compute the geographical coordinates and azimuth angle. Accordingly, computations using GNSS position information with high degrees of error can be suppressed, and thus the measurement accuracy of the geographical coordinates and the azimuth angle of the surveying device 1 can be improved.

Additionally, the ring-shaped shape filter 31 having a predetermined width based on the measurement accuracy of the GNSS device 19 is created central to the vertical axial center of the mount section 7, and the shape filter 31 is matched to the position information distribution area 29 such that the greatest number of pieces of GNSS position information is present within the shape filter 31. Accordingly, using GNSS position information with high degrees of error in the computations can be prevented, and thus the measurement accuracy of the geographical coordinates and the azimuth angle can be improved.

Additionally, computations are only continued in the case where the number of pieces of GNSS position information located within the shape filter 31 is greater than or equal to a setting value, whereas the GNSS position information is re-obtained in the case where the number of pieces of GNSS position information is less than the setting value. As such, a drop in the measurement accuracy caused by an insufficient number of pieces of GNSS position information within the shape filter 31 can be prevented.

Additionally, circular fitting using the least squares method is carried out on the GNSS position information within the shape filter 31, and the center coordinates of the fitted circle are computed as the geographical coordinates of the surveying device 1. Accordingly, only GNSS position information with a low degree of error is used in the computation, and thus the geographical coordinates of the surveying device 1 can be measured accurately.

Additionally, the communication section 23 that can connect to the Internet over a wire or wirelessly is provided, the communication section 23 obtains the Internet position information of a known observation point, and the computed geographical coordinates are corrected using the Internet position information. Accordingly, the geographical coordinates of the surveying device 1 can be measured more accurately.

Additionally, in the present embodiment, the GNSS position information is obtained having stopped the rotation of the mount section 7 for a predetermined amount of time at the first coordinate obtainment position 27, and the GNSS position information is obtained having stopped the rotation of the mount section 7 for a predetermined amount of time at the second coordinate obtainment position 28.

Accordingly, when computing the azimuth angle of the surveying device 1, the number of pieces of GNSS position information used in the computation can be increased, and thus the measurement accuracy can be improved. Note that the amount of time for which the mount section 7 is stopped at the first coordinate obtainment position 27 and the second coordinate obtainment position 28 is determined on the basis of the required accuracy of the azimuth angle. Accordingly, in the case where high accuracy is not required, the rotation of the mount section 7 need not be stopped at the first coordinate obtainment position 27 and the second coordinate obtainment position 28.

Additionally, a numerical filter that allows values near a center to pass, such as a median filter or a Laplacian filter, is applied to the GNSS position information obtained at the first coordinate obtainment position 27 and the second coordinate obtainment position 28. Accordingly, noise values having a high degree of error can be removed, and the measurement accuracy of the azimuth angle can be improved.

Although the second coordinate obtainment position 28 is a position distanced from the first coordinate obtainment position 27 by 180° in the present embodiment, it should be noted that the second coordinate obtainment position 28 may be at another angle, such as 90° or 120°, as long as the horizontal angle at that time is known. On the other hand, when measuring the azimuth angle, the accuracy is higher the greater the distance between the first coordinate obtainment position 27 and the second coordinate obtainment position 28 is. Thus, in the case where accuracy is required, it is desirable to set the second coordinate obtainment position 28 to 180° from the first coordinate obtainment position 27, or further increase the value of the radius R.

Additionally, in the present embodiment, the azimuth angle of the surveying device 1 is measured on the basis of GNSS position information obtained at two points, namely the first coordinate obtainment position 27 and the second coordinate obtainment position 28 rotated by a predetermined angle from the first coordinate obtainment position 27. However, three or more coordinate obtainment positions may be set, and the azimuth angle of the surveying device 1 may be measured on the basis of GNSS position information obtained at the three or more points.

Additionally, although the present embodiment describes a case where the geographical coordinates and the azimuth angle of the surveying device 1 are measured, the present embodiment is not limited to the surveying device 1, and can also be applied in cases where precise geographical coordinates or an azimuth is measured for a current position. Thus, it goes without saying that the embodiment can be applied in another device, as long as the device includes a horizontal rotating section capable of rotating horizontally, a leveling section capable of leveling the horizontal rotating section, a horizontal angle detector capable of detecting the horizontal angle of the horizontal rotating section, and a GNSS device having a GNSS antenna provided in a known position from the vertical axial center of the horizontal rotating section.

Furthermore, in the present embodiment, the communication section 23 can connect to the Internet and obtains the measurement information of a known observation point from the Internet. However, the communication section 23 may be capable of Ultra High Frequency (UHF) communication and wireless communication, and may obtain the measurement information through UHF and wireless communication.

What is claimed is:

1. A position and azimuth measurement device comprising:
   a GNSS device, including a GNSS antenna, configured to obtain position information of the GNSS antenna on the basis of observation values from satellites;
   a horizontal rotating section capable of rotating the GNSS antenna horizontally, wherein the GNSS antenna is provided at a known distance from a vertical axial center of the horizontal rotating section;
   a leveling section capable of leveling the horizontal rotating section;
   a horizontal angle detector configured to detect a horizontal angle of the horizontal rotating section; and
   a control device,
   wherein the control device causes the GNSS device to continuously obtain the position information while causing the horizontal rotating section leveled by the leveling section to make one full rotation, and is configured to compute geographical coordinates and an azimuth angle on the basis of the position information obtained throughout the full rotation,
   wherein of the satellites from which the GNSS device obtains the observation values, the control device selects only satellites capable of outputting observation values throughout the full rotation, and
   wherein the control device is configured to create a shape filter having a ring shape and a predetermined width with respect to a circle having a radius equivalent to a distance between the vertical axial center and the GNSS antenna, and match the shape filter to a position in which the number of pieces of the position information located within the shape filter is highest.

2. The position and azimuth measurement device according to claim 1,
   wherein the control device is configured to fit a circle relative to the position information within the shape filter and compute center coordinates of the circle that is fitted.

3. The position and azimuth measurement device according to claim 2,
   wherein the control device includes a communication section configured to obtain measurement information of a known observation point, and is configured to compute the geographical coordinates on the basis of the measurement information obtained through the communication section.

4. The position and azimuth measurement device according to claim 1,
wherein the control device is configured to set a coordinate obtainment position at a desired position of the GNSS antenna and at least one coordinate obtainment position at a position of the GNSS antenna rotated from the coordinate obtainment position by a predetermined angle, stop rotation of the horizontal rotating section for a predetermined amount of time at each of the coordinate obtainment positions, and compute the azimuth angle on the basis of position information obtained at each of the coordinate obtainment positions while the rotation of the horizontal rotating section is stopped.

5. The position and azimuth measurement device according to claim 4,
wherein a numerical filter configured to allow values near a center to pass is applied to the position information obtained at each of the coordinate obtainment positions.

6. The position and azimuth measurement device according to claim 5,
wherein each of representative values is selected from each piece of position information obtained at each of the coordinate obtainment positions, and the azimuth angle is computed on the basis of a coordinate difference among the representative values.

7. A surveying device comprising:
a GNSS device, including a GNSS antenna, configured to obtain position information of the GNSS antenna on the basis of observation values from satellites;
a horizontal rotating section capable of rotating the GNSS antenna horizontally, wherein the GNSS antenna is provided at a known distance from a vertical axial center of the horizontal rotating section;
a leveling section capable of leveling the horizontal rotating section;
a telescope section provided on the horizontal rotating section and capable of vertical rotation;
a rangefinding section, housed within the telescope section, configured to measure a range by emitting rangefinding light and receiving the rangefinding light that has been reflected;
a horizontal angle detector configured to detect a horizontal angle of the horizontal rotating section;
a vertical angle detector configured to detect a vertical angle of the telescope section; and
a control device,
wherein the control device causes the GNSS device to continuously obtain the position information while causing the horizontal rotating section leveled by the leveling section to make one full rotation, and is configured to compute geographical coordinates and an azimuth angle on the basis of the position information obtained throughout the full rotation,
wherein of the satellites from which the GNSS device obtains the observation values, the control device selects only satellites capable of outputting observation values throughout the full rotation, and
wherein the control device is configured to create a shape filter having a ring shape and a predetermined width with respect to a circle having a radius equivalent to a distance between the vertical axial center and the GNSS antenna, and match the shape filter to a position in which the number of pieces of the position information located within the shape filter is highest.

8. The surveying device according to claim 7,
wherein the control device is configured to fit a circle relative to the position information within the shape filter and compute center coordinates of the circle that is fitted.

9. The surveying device according to claim 8,
wherein the control device includes a communication section configured to obtain measurement information of a known observation point, and is configured to compute the geographical coordinates on the basis of the measurement information obtained through the communication section.

10. The surveying device according to claim 9,
wherein the control device is configured to set a coordinate obtainment position at a desired position of the GNSS antenna and at least one coordinate obtainment position at a position of the GNSS antenna rotated from the coordinate obtainment position by a predetermined angle, stop rotation of the horizontal rotating section for a predetermined amount of time at each of the coordinate obtainment positions, and compute the azimuth angle on the basis of position information obtained at each of the coordinate obtainment positions while the rotation of the horizontal rotating section is stopped.

11. The surveying device according to claim 10,
wherein a numerical filter configured to allow values near a center to pass is applied to the position information obtained at each of the coordinate obtainment positions.

12. The surveying device according to claim 11,
wherein each of representative values is selected from each piece of position information obtained at each of the coordinate obtainment positions, and the azimuth angle is computed on the basis of a coordinate difference among the representative values.

* * * * *